United States Patent
Irish et al.

(10) Patent No.: US 7,634,591 B2
(45) Date of Patent: Dec. 15, 2009

(54) METHOD AND APPARATUS FOR TRACKING COMMAND ORDER DEPENDENCIES

(75) Inventors: John David Irish, Rochester, MN (US); Chad B. McBride, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 11/340,736

(22) Filed: Jan. 26, 2006

(65) Prior Publication Data

US 2007/0174493 A1    Jul. 26, 2007

(51) Int. Cl.
*G06F 3/00* (2006.01)
*G06F 9/30* (2006.01)

(52) U.S. Cl. ..................... 710/18; 712/216
(58) Field of Classification Search ............ 710/5, 710/18; 718/102; 712/216, 217
See application file for complete search history.

(56) References Cited

U.S. PATENT DOCUMENTS

| | | | | |
|---|---|---|---|---|
| 4,229,790 A | * | 10/1980 | Gilliland et al. | ............ 718/101 |
| 5,710,902 A | * | 1/1998 | Sheaffer et al. | ............ 712/216 |
| 6,006,326 A | * | 12/1999 | Panwar et al. | ............... 712/217 |
| 6,128,672 A | * | 10/2000 | Lindsley | ...................... 710/19 |
| 6,557,095 B1 | * | 4/2003 | Henstrom | ................... 712/216 |
| 6,629,195 B2 | * | 9/2003 | Schroeder et al. | ........... 711/108 |
| 6,823,511 B1 | * | 11/2004 | McKenney et al. | ........ 718/102 |

\* cited by examiner

*Primary Examiner*—Henry W. H. Tsai
*Assistant Examiner*—Hyun Nam
(74) *Attorney, Agent, or Firm*—Patterson & Sheridan, LLP (57) ABSTRACT

Methods and apparatus for tracking dependencies of commands to be executed by a command processor are provided. By determining the dependency of incoming commands against all commands awaiting execution, dependency information can be stored in a dependency scoreboard. Such a dependency scoreboard may be used to determine if a command is ready to be issued by the command processor. The dependency scoreboard can also be updated with information relating to the issuance of commands, for example, as commands complete.

5 Claims, 9 Drawing Sheets

METHOD AND APPARATUS FOR TRACKING COMMAND ORDER DEPENDENCIES

BACKGROUND OF THE INVENTION

1. Field of the Invention

The present invention generally relates to tracking the dependency of commands within a command queue.

2. Description of the Related Art

Computing systems often include central processing units (CPUs). Often requests to execute commands are made to the CPU from other devices within a system. Examples of devices which may make a command request to a CPU include a video card, sound card, or an I/O device within a system. Input or output (I/O) traffic for a CPU can be classified as Inbound or Outbound. Inbound traffic comes from an I/O device into the CPU. Outbound traffic is initiated from the CPU and goes to an I/O device. As commands come into the CPU they are placed into a command queue. The command queue is used to maintain order and priority amongst the different commands the CPU receives. In some CPUs the command queue is a FIFO (first in first out) queue, or one that executes the commands in the order in which they were received.

A command queue may include commands which are dependent on commands within the same or other command queues. An example of a dependent command is a command to read from an address received after a command to write to the same address. If the read command is executed before the write command the data read may not be current (not updated the data from the write command, i.e. "stale"). Therefore, it is essential that a command queue issue commands to be executed by the CPU in an order such that the adverse effects of command dependencies are not realized (e.g. data read is not stale).

One way to avoid the adverse effects of command dependencies is to enforce ordering on the I/O commands in software. In other words software may be required to be written to not allow load or store commands to the same memory location to be in-flight at the same time. However, this solution is not desirable because it limits the ability of software to use DMA (direct memory access) engines and pipelined access to memory.

Another way to avoid the adverse effects of command dependencies is to use a second FIFO command queue containing multiple pointers. The pointers target commands within the first command queue. When two commands within the first command queue are set to use the same address, a stall pointer is set to mark the new "colliding" command. The "colliding" command and all commands behind it are stalled until all commands ahead of it, including the command that targeted the same address, have exited the queue. The drawbacks to this solution are that it forces the use of a second FIFO, prevents commands that have no dependencies from going ahead of commands that have dependencies, and commands are over stalled because this approach only looks at one dependency at a time, not every dependency individually.

Therefore, there is a need for an improved method and apparatus for tracking command dependencies within command queues.

SUMMARY OF THE INVENTION

The present invention generally provides a method and apparatus for tracking command dependencies within command queues of a processing device.

One embodiment provides a method of tracking dependencies of commands within one or more command queues of a processor. The method generally includes (a) generating dependency information identifying whether a first command received into the command queues depends on other commands previously received in the command queues, (b) storing the command dependency information in a command dependency scoreboard, (c) preventing issuance of the first command if the dependency information in the command dependency scoreboard indicates the first command is dependent on other commands in the command queues, (d) updating the command dependency information stored in the command dependency scoreboard after commands issued from the command queues have completed.

Another embodiment provides a processing device generally including one or more command queues for storing commands, a command dependency scoreboard, and command processing logic. The command processing logic is generally configured to generate dependency information identifying whether commands received into the command queues depend on other commands previously received in the command queues, store the command dependency information in the command dependency scoreboard, and utilize the information stored in the command dependency scoreboard to prevent the issuance of commands that depend on other commands previously received in the command queues that have not completed.

Another embodiment provides a system generally including one or more input/output (I/O) devices and a processing device. The processing device generally includes one or more command queues for storing commands received from the I/O devices, a command dependency scoreboard, and command processing logic. The command processing logic is generally configured to generate dependency information identifying whether commands received into the command queues depend on other commands previously received in the command queues, store the command dependency information in the command dependency scoreboard, and utilize the information stored in the command dependency scoreboard to prevent the issuance of commands that depend on other commands previously received in the command queues that have not completed.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may lead to other equally effective embodiments.

DETAILED DESCRIPTION OF THE PREFERRED EMBODIMENTS

Embodiments of the present invention allow for a flexible and scaleable mechanism for tracking dependencies of commands to be executed by a processor. By determining the dependency of incoming commands against all commands awaiting execution, dependency information can be stored in a dependency scoreboard. Such a dependency scoreboard may be used to determine if a command is ready to be issued by the command processor. Furthermore, a dependency scoreboard can also be updated with information relating to the issuance of commands, for example as commands complete. The use of such a command dependency scoreboard reduces latency, avoids the adverse effects of command dependency, and preserves the order of commands.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

An Exemplary System

Figure 1:
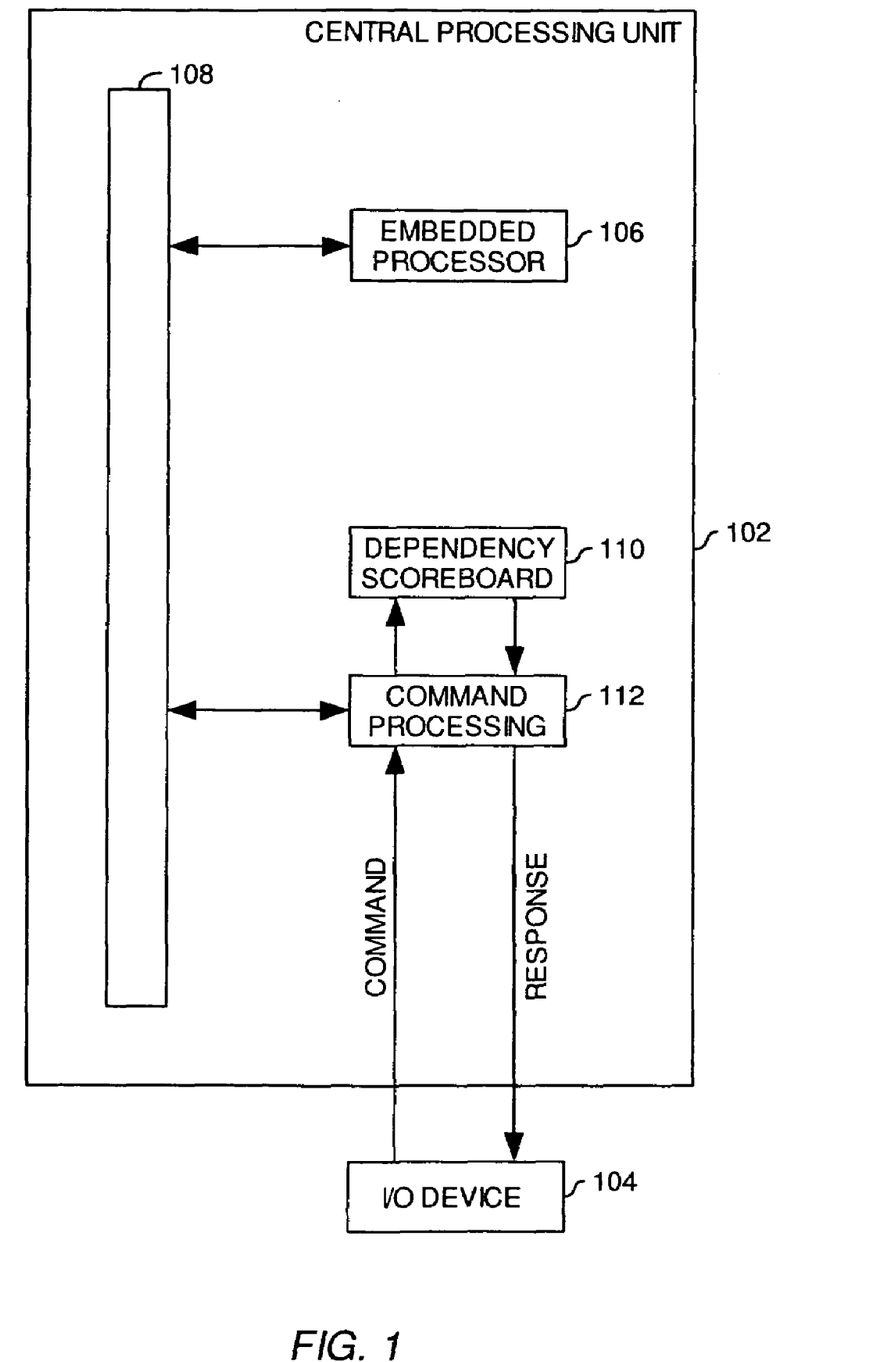
FIG. 1 is a block diagram illustrating a computing environment according to one embodiment of the invention.

FIG. 1 is a block diagram illustrating a central processing unit (CPU) 102 coupled to an I/O device 104, according to one embodiment of the invention. In one embodiment, the CPU 102 may reside within a computer system such as a personal computer or gaming system. The I/O device 104 may also reside within the same computer system. In a modern computing system there may be a plurality of I/O devices 104 attached to the CPU 102. For example, an I/O device 104 may consist of random access memory (RAM), a video card, or a hard drive. The I/O device 104 may be physically attached to the CPU 102 inside of the computing system by means of a bus.

An I/O device 104 will send commands to the CPU 102 for execution. The CPU 102 may respond to the I/O device 104 with a result. In one embodiment, a command processing system 112, may reside within the CPU 102. Within the command processing system 112 commands sent from I/O devices 104 are stored and prepared (i.e., address translation) for execution by the CPU 102. A CPU 102 may contain an on-chip bus 108 for communication between different CPU 102 logic devices such as the command processing system 112 and the embedded processor 106.

Figure 2:
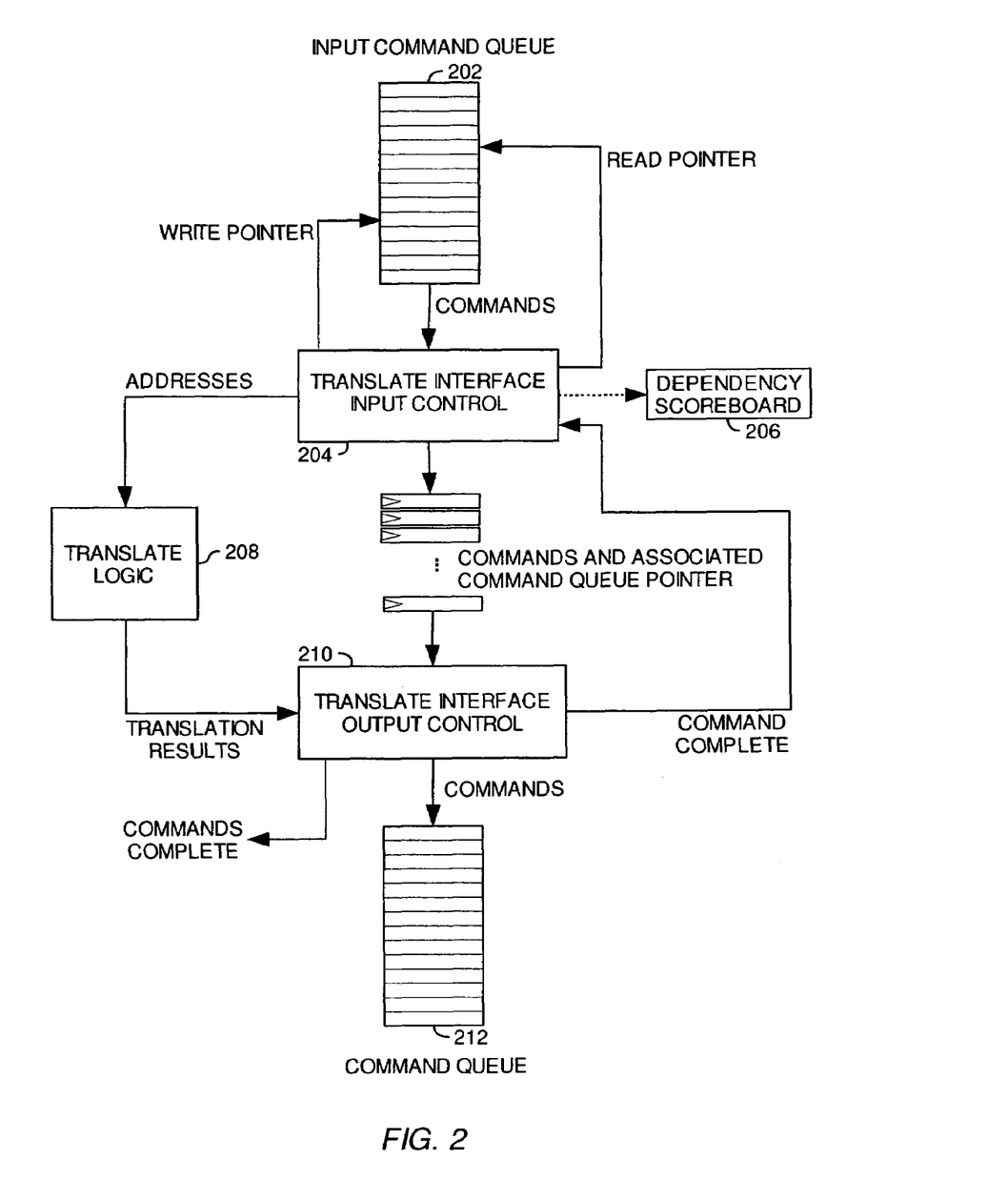
FIG. 2 is a block diagram illustrating command processing ordering logic according to one embodiment of the invention.

As commands are received by the CPU 102 they are processed in the command processing system 112. FIG. 2 is a block diagram illustrating a command processing system 112, according to one embodiment of the invention. As commands are sent by the I/O device 104 and received by the CPU 102, they may be placed in an input command queue 202. The input command queue 202 may be a FIFO (first in first out) so that the commands are executed in the order which they were received. A command in the input command queue 202 may then be sent to a translate interface input control 204.

A translate interface input control 204 performs processes relating to the determination and tracking of command dependencies, according to one embodiment of the invention. A translate interface input control 204 may access a dependency scoreboard 206. A dependency scoreboard 206 may be used to track the dependency of commands on other commands that have been received by the CPU. Once a command is received by the translate interface input control 204, processes are performed to determine if the command depends on any other commands already received by the input command queue 202. In one embodiment of the invention, a dependency determination is performed by comparing the target address of the command to the target addresses of previous commands using a CAM (content addressable memory) compare unit to create a vector of hits and misses. A vector may be a string of bits including '1's and '0's, where a '1' may represent a hit and a '0' may represent a miss. The results of this comparison may then be used to populate the dependency scoreboard 206. The population of the dependency scoreboard 206 through the use of a CAM compare unit is further described below in FIGS. 5 and 6.

If a new command has a dependency on an earlier received command, the new command will need to be stalled until the commands on which it depends have received a response from a downstream logical unit. The translate interface input control 204 can control the stalling of a command via the read pointer. If the result of the comparison to the CAM compare unit was that the command in the input command queue 202 did not have a dependency on any other commands within the queue 202, the translate interface input control may send the command and its associated command pointer to a translate interface output control 210. A command processing system 112 may also include translate logic 208 to aid in the translation of a virtual address to a physical address. In one embodiment, a translate interface output control 210 performs processes related to the issuance of commands to the on-chip bus 108 of the CPU 102.

After the command has been issued to the on-chip bus 108 and executed, the translate interface output control 210 sends a command complete signal back to the translate interface input control 204. This signal may be used to update the dependency scoreboard 206, for example, by clearing any dependencies related to the command that was just executed by the embedded processor 124.

Exemplary Operations

Figure 3:
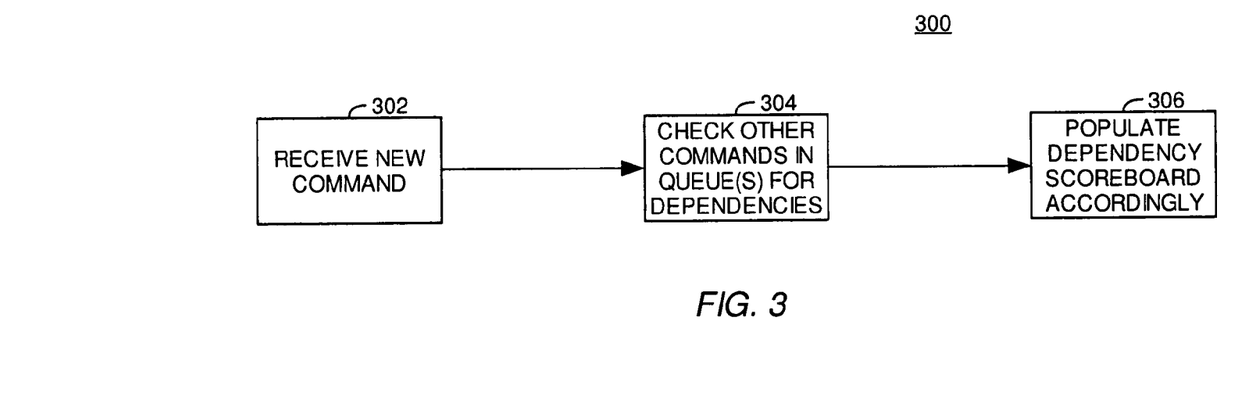
FIG. 3 is a flowchart illustrating a method of populating a command dependency scoreboard, according to one embodiment of the invention.

FIG. 3 is a flowchart illustrating a method 300 for populating a command dependency scoreboard 206, according to one embodiment of the invention. The method 300 is an example of an operation that may be carried out by the translate interface input control 204. The method begins at step 302 where a new command is received. Next, the method 300 proceeds to step 304 where a check is performed against other commands in the queue for dependencies.

The check performed in step 304 may be performed by sending the address targeted by the command to a CAM compare unit. By sending the address of the command to a CAM compare unit, the CAM compare unit will return a result indicating all of the other commands within the command queue on which the command depends. The use of a CAM compare unit to determine command dependencies is further described in FIG. 6.

Next, the method 300 proceeds to step 306 where the results of step 304, the command's dependencies, are stored in a dependency scoreboard 206. This method 300 is shown as taking place in three steps, however within a processor 102, the three steps may take place within a single cycle. Once updated, the dependency scoreboard 206 may be used to determine when a command can be executed. To ensure that there are no adverse effects from command dependencies, a command should not be executed until all of the other commands upon which it depends have been executed. To determine when all commands upon which a command depends have been executed, the translate interface input control 204 can use the dependency scoreboard 206.

Figure 4:
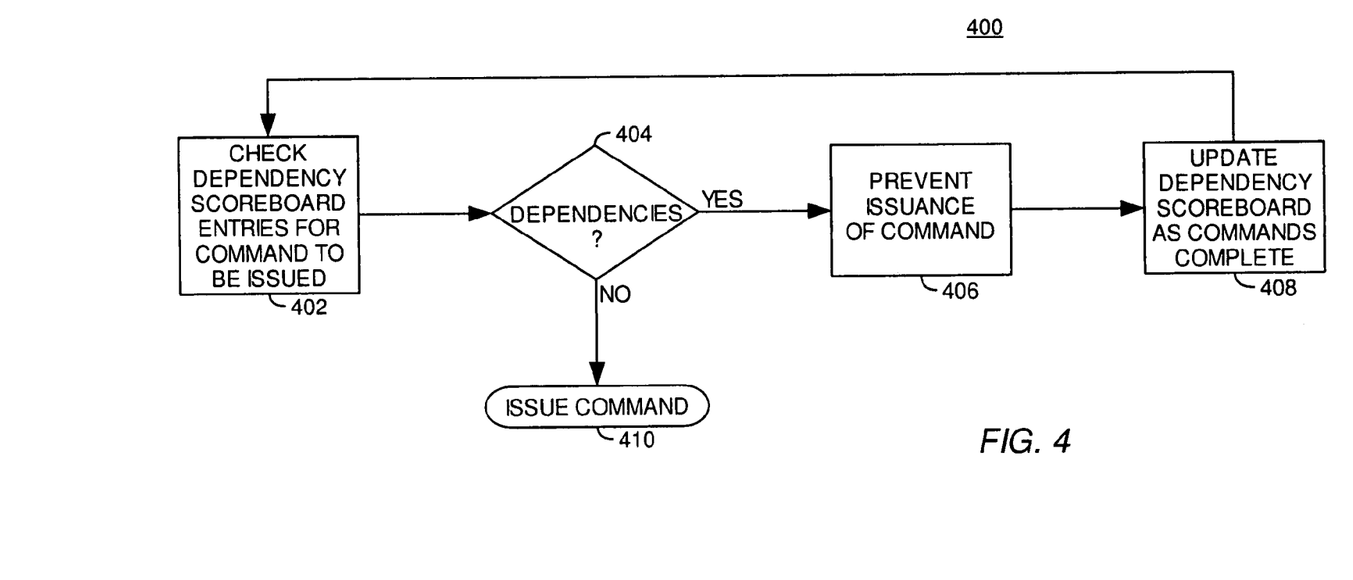
FIG. 4 is a flowchart illustrating a method of utilizing a command dependency scoreboard to control command execution, according to one embodiment of the invention.

FIG. 4 is a flowchart illustrating a method 400 of utilizing a command dependency scoreboard 206 to control command execution, according to one embodiment of the invention. The method 400 begins at step 402 where the dependency scoreboard 206 is checked for entries in relation to the command that is about to be issued. Next, at step 404, a query is performed to determine if the command has dependencies. The determination may be made by checking the dependency scoreboard 206. If there are no dependencies, the command sent by the translate interface input control 204 to the translate interface output control 210 to await execution. If the command has dependencies, the method 400 proceeds to step 406 where the translate interface input control 204 prevents or stalls the execution of the command until the command or commands on which the command depends have cleared. Next, at step 408, the dependency scoreboard 206 is updated as other independent commands complete. After step 408 is finished, the method 400 returns to step 402 to repeat method 400.

An Exemplary Dependency Scoreboard

Figure 5:
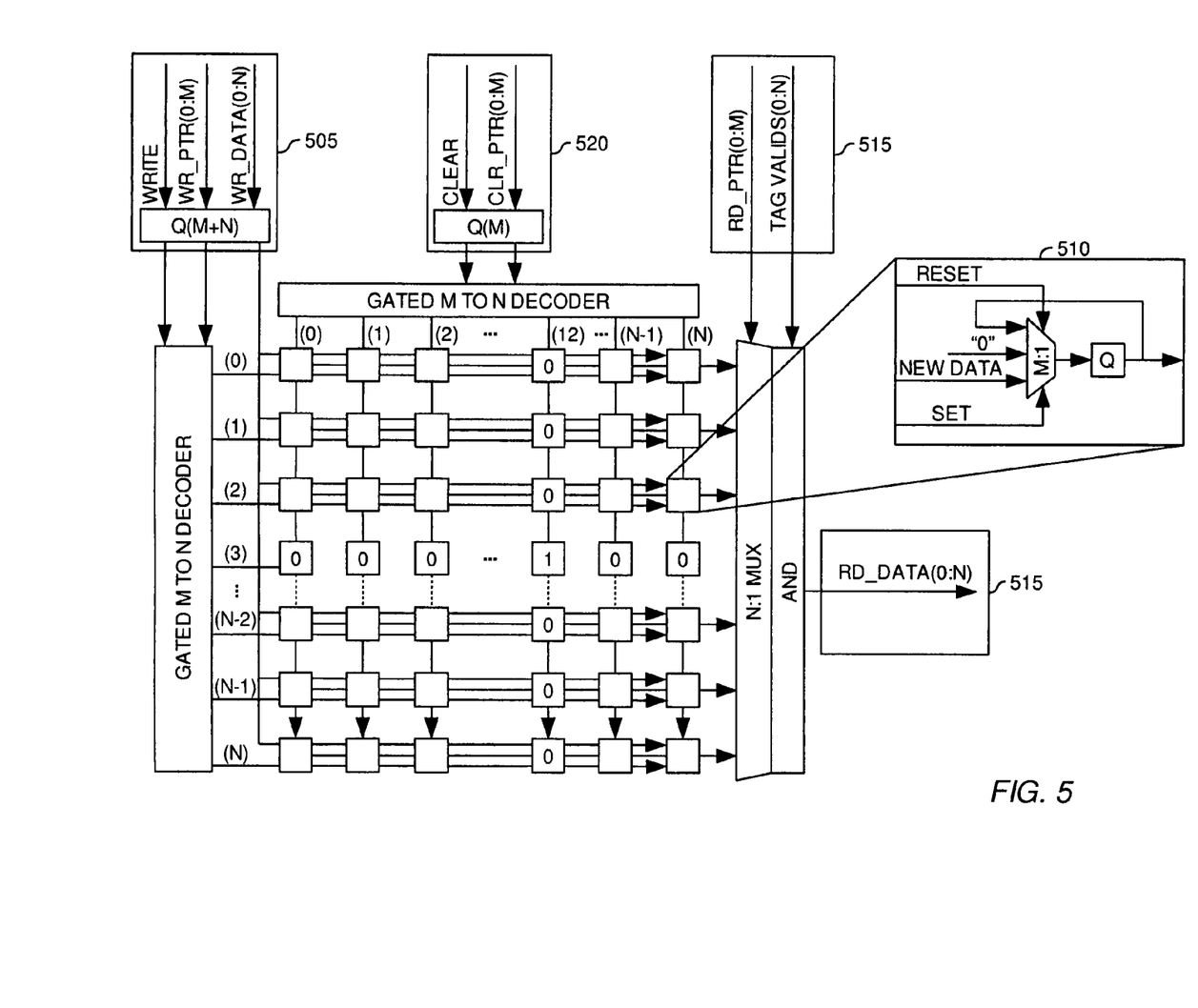
FIG. 5 is a schematic diagram illustrating a command dependency scoreboard, according to one embodiment of the invention.

FIG. 5 is a block diagram illustrating a dependency scoreboard 500, according to one embodiment of the invention. The dependency scoreboard 500 may be constructed with rows representing dependent commands and columns corresponding to independent commands. The intersection of the rows and columns, referred to herein as cells, may be made up of logic devices as seen in FIG. 5 at 510. In one embodiment, each cell may store more than a bit of dependency information. In another embodiment, each cell may store only one bit of dependency information. As an example, the cell located at the intersection of row three and column twelve may have a bit set to '1' indicating that dependent command [3] (command identification number, or index three) is dependent on independent command [12].

In one embodiment, a command queue with n+1 registers for n+1 commands may have n+1 rows and n+1 columns. As a command is received in the translate interface input control 204 it is checked for dependencies. This may be performed by using a CAM compare unit. The use of a CAM compare unit to determine command dependencies is further described in FIG. 6. The results of a CAM check may be placed in a row corresponding to the command's location in the input command queue 202. If the results of the CAM check indicate that the command targets the same address as another earlier received command or there is some other type of dependency, a bit may be set in the dependency scoreboard 500 in each of the columns corresponding to the commands on which it is dependent.

The results of the CAM comparison may be written into the dependency scoreboard 500 by sending the results of the CAM comparison to the dependency scoreboard 500. Using a write pointer (wr_ptr(0:m)) and a write data line (wr_data(0:n)), the results of the CAM comparison may be written into the appropriate row of the dependency scoreboard. The write pointer (wr_ptr(0:m)) indicates what row within the dependency scoreboard to write the data to, while the write data line (wr_data(0:n)) carries the resulting data from the CAM comparison into the dependency scoreboard 500.

For example, assume a command is received as command [3] in the input command queue 202, which targets the same address as command [12] in the input command queue 202. In this example, dependency information for the command [3] may be represented by the third row in the dependency scoreboard 500. The independent command [12] may be represented by the twelfth column in the dependency scoreboard 500. If command [3] in the input command queue 202 is dependent on command [12] in the input command queue 202 and the CAM compare unit output is written to the third row of the dependency scoreboard 500, the results of the CAM comparison will cause the bit at the intersection point of the third row and the twelfth column of the dependency scoreboard 500 to be set to '1'. This '1' symbolizes the dependency of command [3] on command [12].

One example of a dependency cell used to store a bit of dependency information is illustrated at 510. If new data indicating a command dependency is received from the results of the CAM comparison, the cell illustrated at 510 sets that bit in the dependency scorecard 500 to a '1'. The translate interface control 204 may now use the dependency scoreboard 500 by reading the data 515 within the dependency scorecard to determine if a command is dependency free and can be issued.

In this example, command [3] will not be issued because of a check of the dependency scoreboard will show a bit in the third row twelfth column corresponding to command [3] is set to '1'. Thus, the dependency scorecard 500 reflects command [3] dependency on command [12]. However, by checking the command dependency scoreboard the translate interface control 204 may determine that command [12] is not dependent on any other commands. The translate interface control 204 may now issue command [12] to the embedded processor 106 for execution.

Once command [12] issues, the dependency scoreboard needs to be updated so that commands that were dependent on command [12] (such as command [3]) can now be issued. To update the command dependency scoreboard, the column in the dependency scoreboard corresponding to command [12] is cleared when the commands complete signal is returned from a translate interface output control 212. Clearing of the scoreboard is performed by the use of a clear signal to set the bits in the column to '0', and a clear pointer (clear_ptr(0:m)) to point to the column of the command which has just been issued. For example, if command [12] has been issued, a command complete signal will be returned from the translate interface output control 210. Thus, a clear signal is now present, and the clear pointer is set to column [12] (clear_ptr (12)). Consequently, all of the cells in column twelve will be set to '0'. In the preceding example, this would place a '0' in the cell located at the intersection of column twelve and row three (and all other cells in the column). Thus, the next time the translate interface control 204 checks the dependency scoreboard 500 for dependencies of command [3] by performing a read of the bits in row three (i.e. the read pointer is set to row three: rd_ptr(3)), the translate interface control 204 will see that no bits in the third row are set to '1'. Therefore, the translate interface control 204 will send command [3] to the translate interface output control 210.

Figure 6:
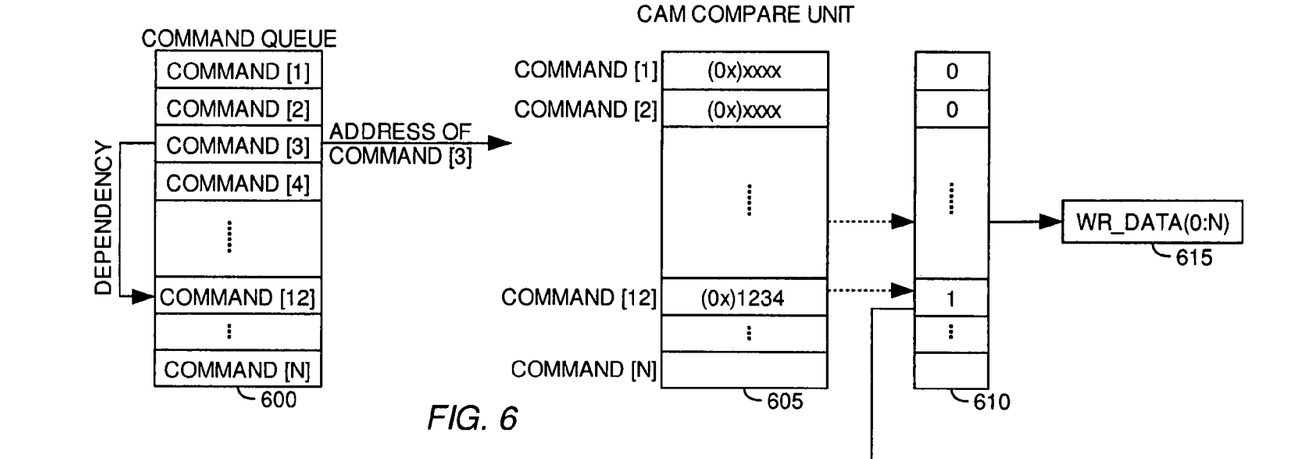
FIG. 6 is a block diagram illustrating the use of a content addressable memory (CAM) compare unit, according to one embodiment of the invention.

FIG. 6 is a block diagram illustrating the use by the translate interface input control 204 of a CAM compare unit 605, according to one embodiment of the invention. The translate interface input control 204 will use the CAM compare unit 605 to determine if a new command to the input command queue 202 is dependent on any commands already residing in the input command queue 202. FIG. 6 further illustrates the population of the dependency scoreboard 500 using the results of the CAM comparison as described in FIG. 5. To determine if command [3] has a dependency on any other commands already in the input command queue 202, the translate interface input control 204 will compare the targeted address of command [3] against the targeted addresses, addresses (0-n), of all other commands in the input command queue 202, commands (0-n), using a CAM compare unit 605. The translate interface control 204 will send the targeted address of the recently received command, command [3], and the CAM compare unit 605 will return data 610.

This data is n+1 bits wide, where the value of n+1 corresponds to the number of commands within the input command queue 202. The data may consist entirely of '1's and '0's. The position of the '1's in the result may correspond to other commands already present in the input command queue 202 that target the same address. The position of '0's in the result may correspond to other commands already present in the input command queue 202 that do not target the same address. The CAM compare unit data 610 may be used to populate the dependency scoreboard 500 by writing the output of the CAM compare unit 605 to the dependency scoreboard 500 (e.g. as write data 615: wr_data(0:n)). The write data (wr_data(0:n)) 615 may be written to the correct row of the dependency scoreboard 500 by using a write pointer (wr_ptr(0:m)) 505. For example, if the command compared to the CAM was command [3] in the input command queue, the data from the CAM would be written to the third row of the dependency scoreboard 500 by setting the write pointer to the third row (wr_ptr(3)).

Figure 7:
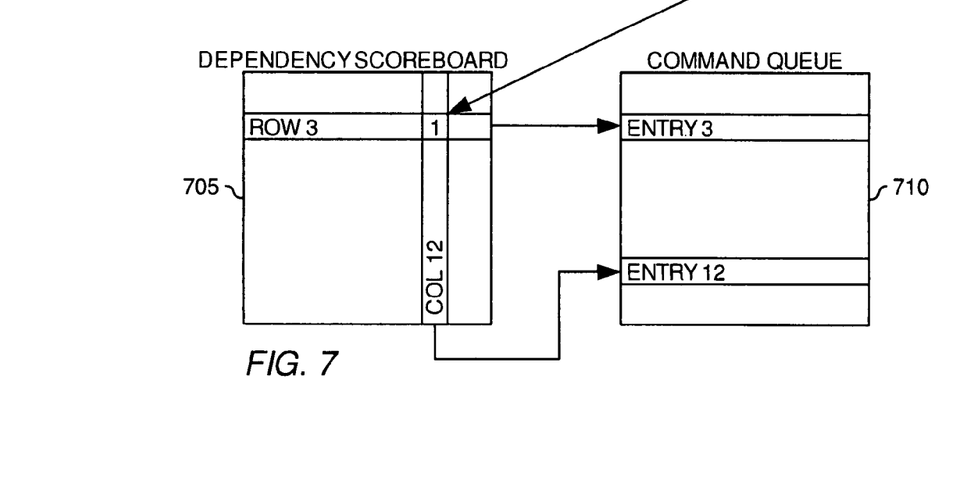
FIG. 7 is a block diagram illustrating a command dependency scoreboard topology, according to one embodiment of the invention.

FIG. 7 is a block diagram illustrating a command dependency scoreboard 705 used to track command dependency within a single inter-dependent command queue 710, according to one embodiment of the invention. The previous example of command [3] being dependent on command [12] also illustrated in FIG. 7. The dependency scoreboard 705 has a single bit set to '1' in the cell where row three and column twelve intersect. This bit may have been set to '1' via the CAM comparison as described in FIG. 6. This '1' illustrates the fact that command [3] of the command queue 710 is dependent on command [12] of the same command queue 710. Thus, a check by the translate interface input control 204 will show the dependency and the translate interface input control 204 will prevent the issuance of command [3], or "stall" command [3], until command [12] has issued.

Multiple Command Queue Dependency Topologies

Figure 8:
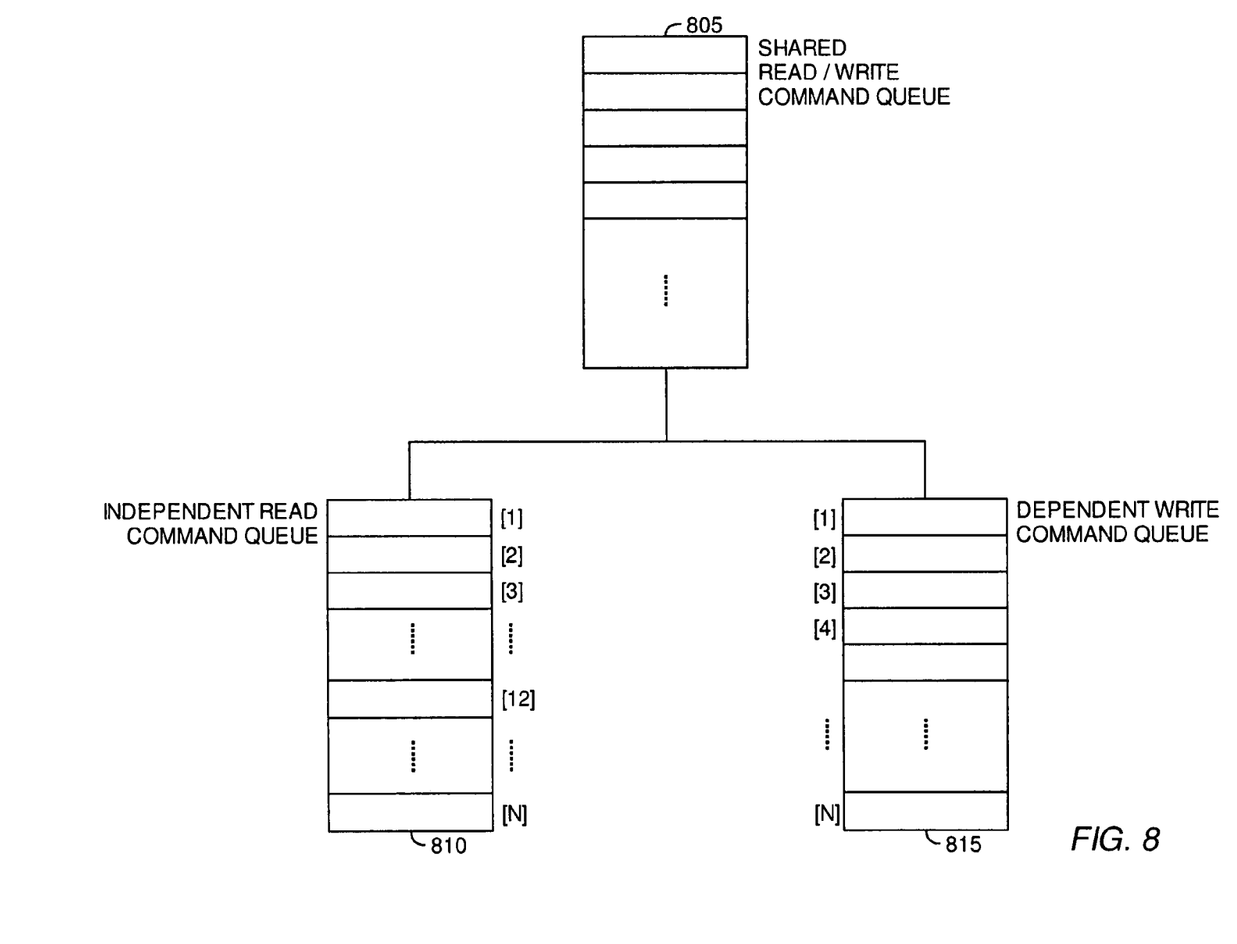
FIG. 8 is a block diagram illustrating the use of a command dependency scoreboard to track command dependencies within multiple command queues, according to one embodiment of the invention.

Not only may a dependency scoreboard may also be used to track a command's dependency upon commands within the same command queue, but also on commands within other command queues as well. FIG. 8 is a block diagram illustrating two command queues. FIG. 8 shows a single shared input command queue 805 which contains both read commands and write commands. This shared command queue 805 may be split into two separate command queues: a read command queue 810 and a write command queue 815. In one embodiment the read command queue 810 is independent of the write command queue 815. That is, the read commands are executed in the order they were received regardless of what commands are behind it in the read command queue 810. The commands in the write command queue 815 may be dependent on commands within the read command queue. For example, write command [3] within the write command queue 815 could be dependent on read command [12] in the read command queue 810. A dependency scoreboard can be used to monitor dependencies between these two queues and determine when the commands may be executed.

Figure 9A:
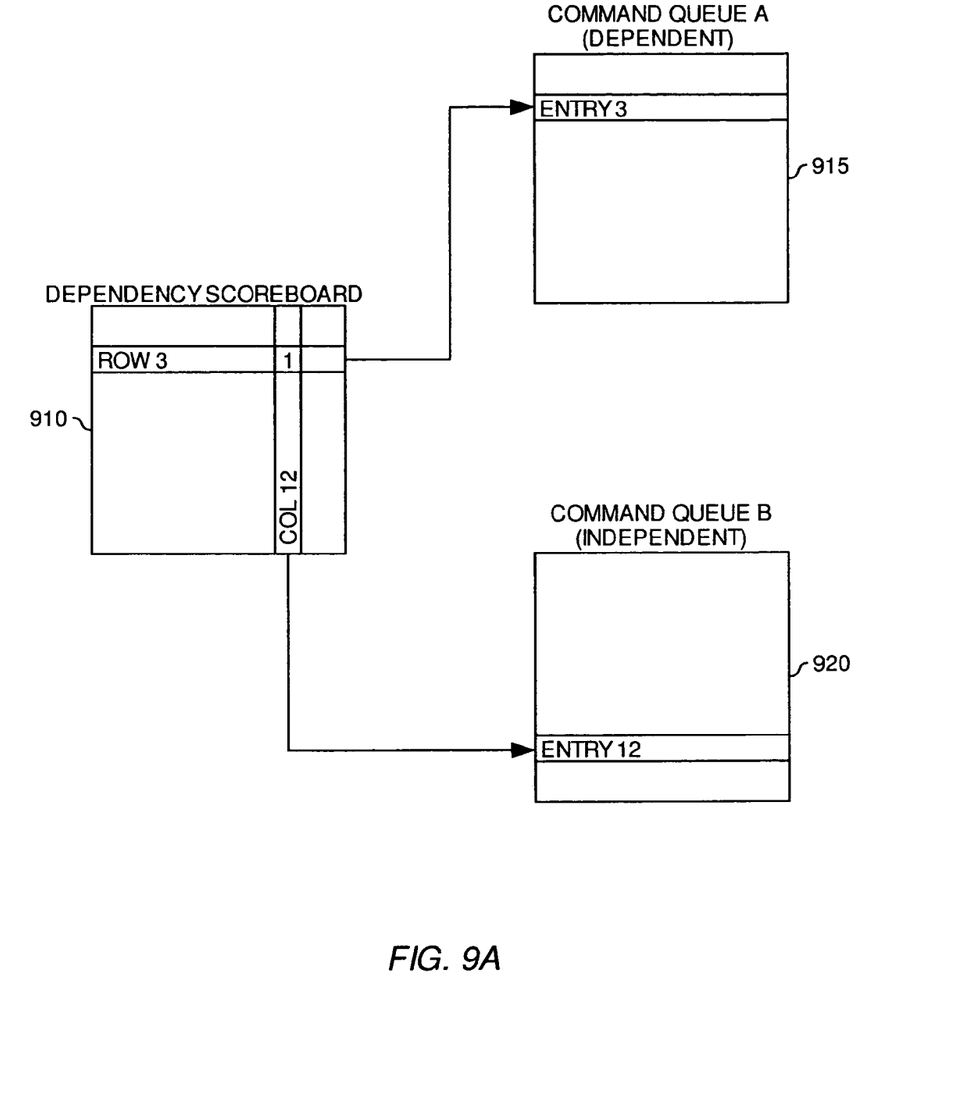
FIGS. 9A-C are block diagrams illustrating command dependency scoreboard topologies, according to one embodiment of the invention.

FIG. 9A is a block diagram illustrating a dependency scoreboard 910 which tracks the dependencies between the read command queue 810 and the write command queue 815 in FIG. 8. In the example given with regards to FIG. 8, write command [3] is dependent on read command [12].

A dependency scoreboard topology to track this type of dependency is constructed by placing all of the independent commands in the columns of the dependency scoreboard 910 and all of the dependent commands in the rows of the scoreboard 910. After doing a CAM comparison with the address of the dependent command, the independent read commands that target the same address will be shown on the dependency scoreboard as '1's where the rows and columns intersect on the scoreboard 910.

The scoreboard 910 can now be used to determine if a dependent write command, such as command [3] can be issued by checking to see if the row in the dependency scoreboard 910 contains any '1's. If command [12] has not been issued then the bit residing in the intersection point of column twelve and row three will be set to '1' as shown in FIG. 9, indicating to the translate interface input control 202 that command [3] should not be issued. However, once command [12] is issued the bit will be cleared by the reset signal. If this has happened, the next time the translate interface input control checks the dependencies of command [3] it will not find any '1's and will issue command [3].

Figure 9B:
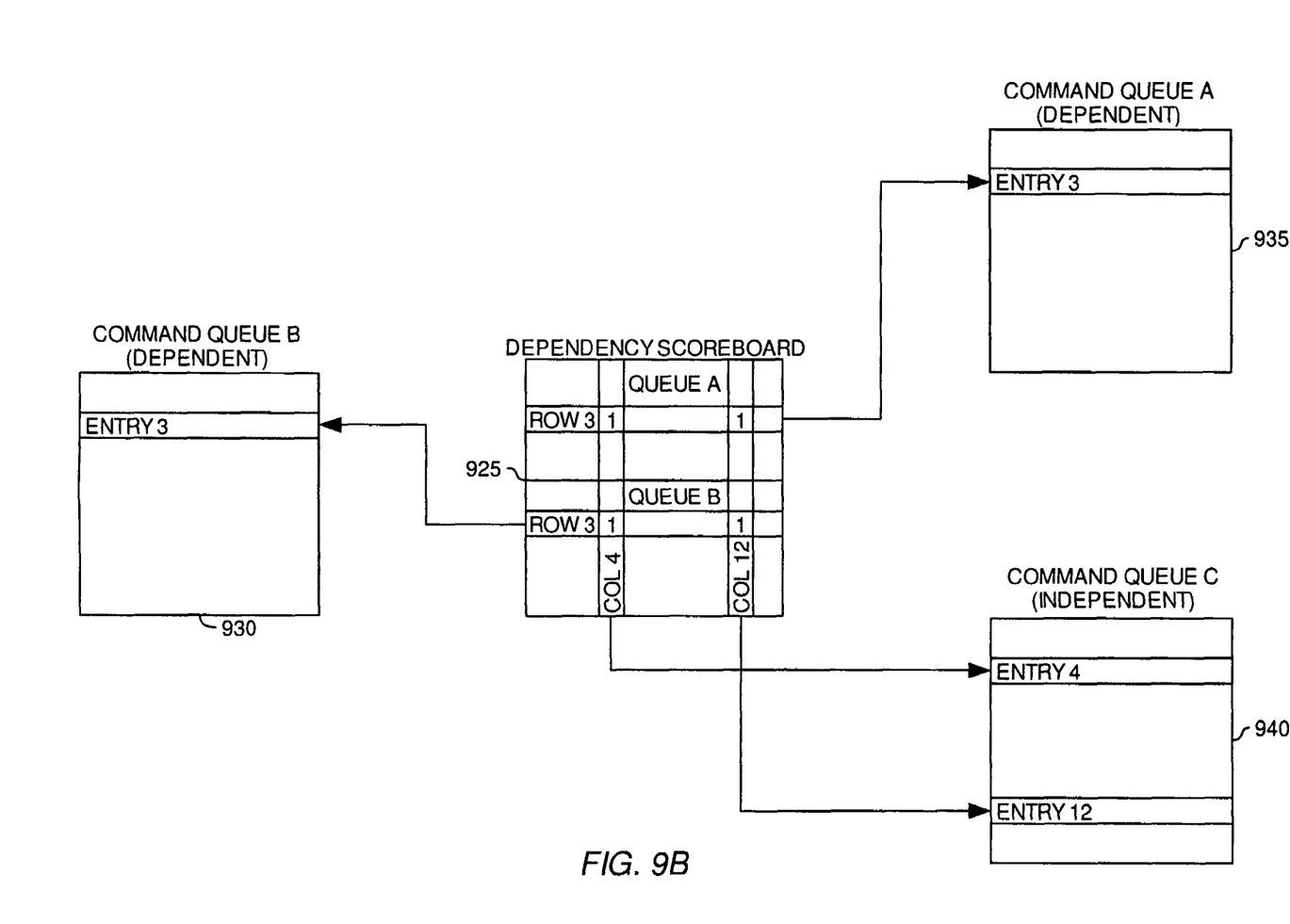

FIG. 9B is a block diagram illustrating a command dependency scoreboard topology 925 used to track command dependency between three command queues, according to one embodiment of the invention. In one embodiment, a CPU 102 may contain three different command queues. One command queue, command queue C 940, may be independent. The other two command queues, command queue A 935 and command queue B 930, may be dependent on certain commands within the independent command queue C 940.

In one embodiment, the dependency scoreboard topology 925 can be constructed to track the dependencies of command queues A 935 and B 930 on the commands within the independent command queue C 940. This is accomplished by having all of the columns within the dependency scoreboard 925 represent the commands within the independent command queue C 940. Furthermore, the dependent commands within the dependent command queues are represented by rows within the dependency scoreboard 925. In one embodiment, the multiple dependent command queues may be represented in the dependency scoreboard 925 by stacking a series of rows that represent one dependent command queue on top of another series of rows in the dependency scoreboard 925 that represent another dependent command queue.

Figure 9C:
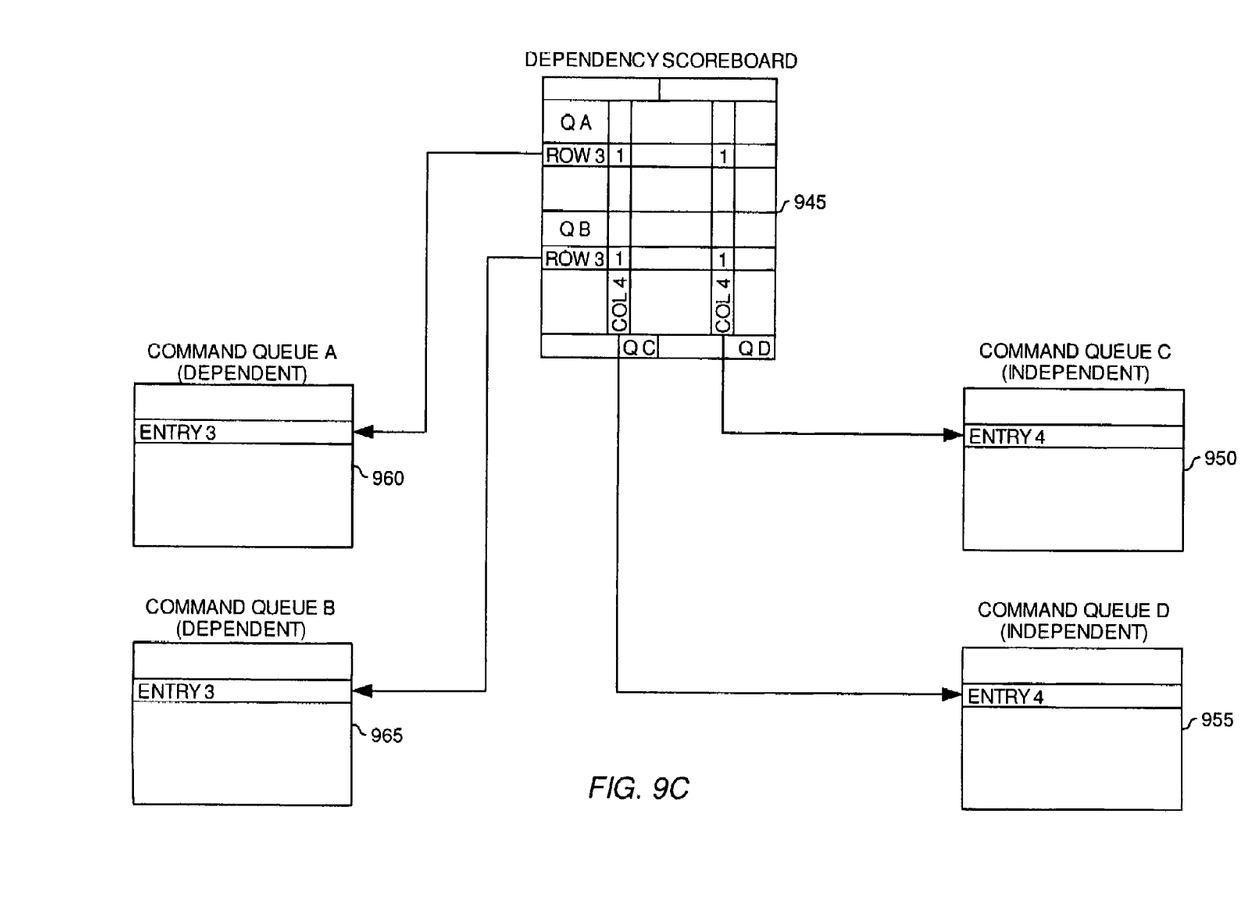

This can be seen in the dependency scoreboard 925 as a series of rows representing command queue A stacked on top of the second series of rows representing command queue B. FIG. 9B also shows how a command, for example command [3], in command queue A 935, may be dependent on commands within the independent command queue, say commands [4] and [12] of command queue C 940. This dependency is illustrated in the dependency scoreboard 925 by the '1' at the intersection of column 4 and row three of queue A, and the '1' at the intersection of column twelve and row three of queue A. Furthermore, FIG. 9B shows how command [3] in command queue B 930, may be dependent on commands [4] and [12] of command queue C 940. this dependency is illustrated in the dependency scoreboard 925 by the '1' at the intersection of column 4 and row three of queue B, and the '1' at the intersection of column twelve and row three of queue B FIG. 9C is a block diagram illustrating a command dependency scoreboard topology 945 used to track command dependency between four command queues, according to one embodiment of the invention. In one embodiment, a CPU 102 may contain four different command queues. For example there may two independent command queues in the CPU 102: command queue C 950 and a command queue D 955. Furthermore, there may be two dependent command queues in the CPU 102: command queue A 960 and command queue B 965.

A dependency scoreboard topology 945 can be constructed to track the dependencies of commands within the dependent command queues A 960 and B 965 on commands within the independent command queues C 950 and D 955. In one embodiment, this may be accomplished by representing all independent commands in command queue C 950 as a series of columns in the dependency scoreboard 945. Furthermore, all of the independent commands within command queue D 955 may be represented as a series of columns in the dependency scoreboard 945 immediately adjacent to the series of columns representing command queue C 950.

All of the dependent commands of the multiple dependent command queues may be represented in the dependency scoreboard 945 by stacking a series of rows that represent one dependent command queue on top of another series of rows in the dependency scoreboard that represent another dependent command queue. The dependency scoreboard 945 in FIG. 9C illustrates this by showing the rows representing dependent commands in command queue A 960 stacked on top of the rows representing dependent commands in command queue B 965. FIG. 9C also illustrates two examples of how dependent commands would be tracked inside the dependency scoreboard.

The first example illustrates a command within command queue A 960, command [3], being dependent on command [4] within command queue C 950 and on command [4] within command queue D 955. These dependencies are illustrated in the dependency scoreboard 945 by the '1's where row three of the QA portion of the dependency scoreboard 945 intersects with column 4 of the QC portion of the dependency scoreboard and where row three of the QA portion of the dependency scoreboard 945 intersects with column 4 of the QD portion of the dependency scoreboard 945.

The second example illustrates a command within command queue B 965, command [3], being dependent on command [4] within command queue C 950 and on command [4] within command queue D 955. These dependencies are illustrated in the dependency scoreboard 945 by the '1's where row three of the QB portion of the dependency scoreboard 945 intersects with column 4 of the QC portion of the dependency scoreboard 945 and where row three of the QB portion of the dependency scoreboard 945 intersects with column four of the QD portion of the dependency scoreboard 945. As the commands within the independent command queues are issued by the translate interface output control 210, their representative columns are cleared within the dependency scorecard 945 via the reset signal from the translate interface output control 210.

CONCLUSION

By checking the dependency of incoming commands against commands already present in a command queue and saving the results, a dependency scoreboard may be created. This scoreboard may be used to determine whether a command should be issued or stalled. The command dependency scoreboard may also be updated with information regarding issued commands on an ongoing basis. As a result, such a command dependency scoreboard as described herein reduces latency, avoids the adverse effects of command dependency, and preserves the order of commands. Furthermore, the command dependency scoreboard may track command dependency in a single command queue or amongst multiple command queues.

While the foregoing is directed to embodiments of the present invention, other and further embodiments of the invention may be devised without departing from the basic scope thereof, and the scope thereof is determined by the claims that follow.

What is claimed is:

1. A method of tracking dependencies of commands within one or more command queues of a processor, comprising:
 (a) generating dependency information identifying whether a first command issued by the processor received into the command queues depends on other commands issued by the processor previously received in the command queues, wherein the first command depends on another command if an address targeted by the first command is the same as an address targeted by one or more commands previously received in the command queues;
 (b) storing the command dependency information in a command dependency scoreboard, wherein the command dependency scoreboard is a two dimensional grid, with rows or columns along one axis corresponding to independent commands and columns or rows along another axis corresponding to dependent commands, and information indicating dependency between the first command and a second command is stored at an intersection of a row or column corresponding to the first command and a column or row corresponding to the second command;
 (c) preventing issuance of the first command if the dependency information in the command dependency scoreboard indicates the first command is dependent on other commands in the command queues; and
 (d) updating the command dependency information stored in the command dependency scoreboard after commands issued from the command queues have finished executing.

2. The method of claim 1, wherein:
 the first command is received in a first command queue; and the dependency information identifies whether the first command depends on other commands previously received in the first command queue.

3. The method of claim 1, wherein:

the first command is received in a first command queue; and the dependency information identifies whether the first command depends on other commands received in at least a second command queue.

4. The method of claim 1, wherein the address targeted by the first command is determined to be the same as an address targeted by the one or more commands previously received in the command queues by using a content addressable memory wherein a compare type access to the content addressable memory produces a vector output indicating an entry or entries within the content addressable memory which match the address targeted by the first command.

5. The method of claim 4, wherein storing the command dependency information in a command dependency scoreboard comprises storing the vector output of the compare type access to the content addressable memory in the command dependency scoreboard.

\* \* \* \* \*